United States Patent [19]
Karpen et al.

[11] Patent Number: 5,831,254
[45] Date of Patent: Nov. 3, 1998

[54] EXPOSURE CONTROL APPARATUS FOR USE WITH OPTICAL READERS

[75] Inventors: Thomas W. Karpen, Skaneateles; Dennis W. McEnery, Marcellus; Robert C. Gardiner, Liverpool; John A. Pettinelli, Rome, all of N.Y.

[73] Assignee: Welch Allyn, Inc., Skaneateles Falls, N.Y.

[21] Appl. No.: 574,386

[22] Filed: Dec. 18, 1995

[51] Int. Cl.$^6$ .................................................. G06K 7/10
[52] U.S. Cl. ........................ 235/454; 235/455; 235/462
[58] Field of Search .................... 235/454, 455, 235/462; 396/98, 103, 108, 225, 232

[56] References Cited

U.S. PATENT DOCUMENTS

| | | | |
|---|---|---|---|
| 4,162,123 | 7/1979 | Isono | 396/98 |
| 4,488,678 | 12/1984 | Hara | 235/463 |
| 4,528,444 | 7/1985 | Hara et al. | 235/462 |
| 4,538,060 | 8/1985 | Sakai et al. | 235/472 |
| 4,818,847 | 4/1989 | Hara et al. | 235/455 |
| 4,933,538 | 6/1990 | Heiman et al. | 235/455 |
| 4,949,391 | 8/1990 | Faulkerson et al. | 382/56 |
| 5,149,948 | 9/1992 | Chisholm | 235/455 |
| 5,248,871 | 9/1993 | Takenaka | 235/462 |
| 5,291,564 | 3/1994 | Shah et al. | 382/48 |
| 5,308,960 | 5/1994 | Smith et al. | 235/454 |
| 5,378,883 | 1/1995 | Batterman et al. | 235/455 |
| 5,382,782 | 1/1995 | Hasegawa et al. | 235/455 |
| 5,430,282 | 7/1995 | Smith et al. | 235/455 |
| 5,446,518 | 8/1995 | Kazumi | 235/472 |
| 5,521,366 | 5/1996 | Wang et al. | 235/472 |
| 5,532,467 | 7/1996 | Roustaei | 235/455 |
| 5,576,529 | 11/1996 | Koenck et al. | 235/472 |
| 5,581,071 | 12/1996 | Chen et al. | 235/455 |
| 5,612,529 | 3/1997 | Coleman | 235/455 |
| 5,621,202 | 4/1997 | Aoki | 235/454 |
| 5,646,390 | 7/1997 | Wang et al. | 235/462 |
| 5,677,522 | 10/1997 | Rice et al. | 235/462 |

FOREIGN PATENT DOCUMENTS

| | | | |
|---|---|---|---|
| 585595 | 3/1994 | European Pat. Off. | 235/455 |
| 183385 | 7/1990 | Japan | 235/455 |

*Primary Examiner*—Donald T. Hajec
*Assistant Examiner*—Douglas X. Rodriguez
*Attorney, Agent, or Firm*—Wall Marjama Bilinski & Burr

[57] ABSTRACT

An exposure control apparatus for use with optical readers, such as bar code readers, which utilize photosensitive image sensors. An illumination signal generating circuit generates an illumination signal having a magnitude that varies in accordance with the time averaged value of the illumination level at the image sensor. A window detecting circuit periodically samples the illumination signal to determine if that signal is or is not within a window of acceptability. Exposure period determining circuitry uses the output of the window detecting circuit to upwardly or downwardly adjust the value of a control variable as necessary to cause the illumination signal to approach, enter and remain within the window of acceptability.

18 Claims, 5 Drawing Sheets

TABLE 1

| COMP. A | COMP. B | STATE |
|---|---|---|
| 0 | 0 | TOO BRIGHT |
| 0 | 1 | IN WINDOW |
| 1 | 1 | TOO DARK |
| 1 | 0 | INVALID |

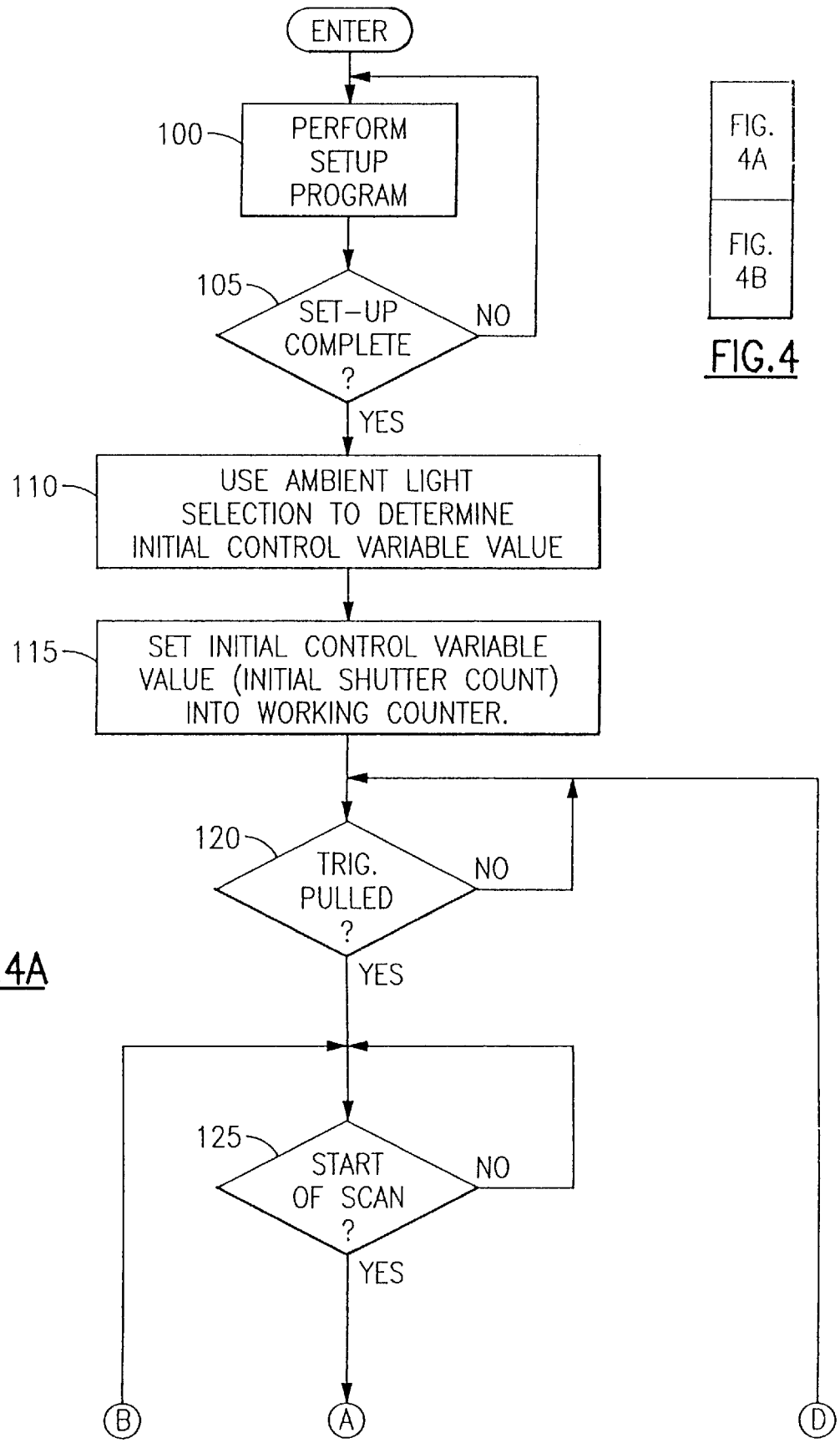

EXPOSURE CONTROL APPARATUS FOR USE WITH OPTICAL READERS

BACKGROUND OF THE INVENTION

The present invention relates to optical reader devices, such as bar code readers, and is directed more particularly to an optical reader having improved exposure control means.

Optical readers, such as bar code readers, have become widely accepted and used in many fields because of their proven ability to read data from optically encoded indicia, such as bar code symbols. Such readers are not only able to read optically encoded data more quickly than human beings, they are able to read it more accurately and consistently.

In spite of their widespread use and acceptance, optical readers have limitations that can prevent them from being used under all of the conditions in which their use would be desirable. One of these limitations is that the photosensitive image sensing array thereof can be so underexposed under low light conditions that the output thereof is too dark to be readily decoded. Conversely, photosensitive image sensing array can be so overexposed under bright light conditions that the output thereof is too bright to be readily decoded. This is because, under both of these conditions, the output signal of the array provides a low contrast between the white and black elements of the indicia and because such low contrast results in poor signal-to-noise ratios.

Another of these limitations is that optical readers are often restricted to operation with a depth of field that is relatively shallow. In other words, optical readers may fail to produce a readily decodable output when the distance between the reader and its target indicia is too great. This is in part because large distances between the reader and the indicia decrease the total light intensity at the indicia and thereby tend to underexpose the readers photosensitive image sensing array. This limitation is particularly troublesome in the case of readers which rely on built-in light sources, such as LED's, rather than on ambient light levels, to provide the illumination necessary for accurate reading.

Prior to the present invention, the above-discussed limitations have been dealt with in a variety of different ways. One of these is to provide the reader with automatic gain control (AGC) circuitry for increasing or decreasing the gain or loss applied to signals produced by the photosensitive array as necessary to cause those signals to have a predetermined standardized value. One example of a reader having such AGC circuitry is described in U.S. Pat. No. 4,528,444 (Hara, et al.).

Another approach to overcoming the above-discussed limitations is to provide the reader with exposure control circuitry for increasing or decreasing the time period during which the photosensitive sensing array is exposed. Because such arrays produce outputs that are dependent on the integral of the illuminating light intensity as a function of time, changes in the exposure time of the array can be used to increase or decrease the magnitude of the output signal as necessary to cause those signals to have predetermined standardized values. An example of a reader having exposure having exposure control circuitry of this type is described in U.S. Pat. No. 4,538,060 (Sakai, et al.).

Still other approaches to overcoming the above-discussed limitations include providing illumination control circuitry for controllably increasing and decreasing the amount of light which the reader directs at the indicia to be read, and distance indicating circuitry that produces a visual distance indication that allows a user to move the reader closer to or further from the target indicia. An example of a reader having circuitry of the former type is described in U.S. Pat. No. 4,818,847 (Hara, et al.).

While the above-described approaches to exposure control improve the performance of the readers with which they are used, they all have deficiencies which limit their usefulness or cause them to make inefficient use of reader circuitry or program space. A frequently encountered one of these deficiencies is that they operate continuously, always seeking to establish a precise, optimum exposure value. Such continuous efforts are inefficient because the benefits which result from their use become insignificant as the optimum exposure value is approached. As a result, a reader can devote large amounts of time and/or program space to producing only marginal improvements in reader performance.

One way of dealing with this inefficiency is to have the exposure control function performed by special purpose hardware, thereby effectively off-loading the burden of exposure control from the readers programmable control circuitry. This off-loading can, however, increase the cost of the reader either by increasing its parts count or by requiring the use of a sophisticated or "smart" image sensor which has a built-in exposure control function.

Another deficiency of known exposure control circuits is that they can take a long time, i.e., many scans, to reach an acceptable exposure time value. This is particularly true in readers which always use the same initial exposure value, and which converge on their final exposure value in increments that are kept small in order to avoid overshooting or oscillating about that value.

Thus, a need has existed for an exposure control circuit and method which is not subject to the above-described deficiencies.

SUMMARY OF THE INVENTION

In accordance with the present invention there is provided an improved exposure control apparatus and method which is not subject to the above-described deficiencies.

Generally speaking the present invention contemplates an exposure control apparatus and method which defines a range or window of acceptable illumination signal values, which makes no attempt to adjust the exposure time of the image sensor so long as the illumination signal is within this window of acceptability, and which makes exposure time adjustments in a manner that causes the illumination signal to fall within the window in a relatively small number of scans. In this way a reader or imaging engine using the invention can devote less of its time to exposure control activity than previously known readers or engines, and thereby have more time to spend on other reader control activities. Alternatively, the reader/engine can be constructed from simpler, less powerful and less costly electronic devices without adversely affecting its ability to successfully image an indicia under a wide variety of ambient illumination levels, and/or at a variety of different reading distances.

In the preferred embodiment, a reader/engine constructed in accordance with the invention includes a relatively simple, inexpensive image sensor which has no built-in exposure or gain control circuitry, and which exposes its photosensitive array during a time period that is started and stopped by externally generated control signal. This embodiment also includes circuitry, responsive to the output signal of the image sensor, for generating an illumination signal that varies in accordance with the intensity of the light incident on the image sensor and the exposure time thereof. Finally, this embodiment includes exposure control circuitry which detects whether the illumination signal has a magnitude that is within a range of acceptable values and, if it is not, adjusts the exposure control signals in accordance with a stored program to cause the illumination signal to enter that range. If the illumination signal is inside of this range of acceptable values, the reader/engine takes no action to change the then current scan rate or exposure time of the image sensor.

Advantageously, the present invention has features that allow a reader to achieve an acceptable illumination level in a relatively short time. One of these features comprises the use of an initial exposure time value which is selected during the time that the reader is being programmed or set-up prior to actual use, preferably by means of a menu that requests the user to identify which of a relatively small number of displayed ambient light options, such as daylight, indoors, etc., best describes the conditions that the reader will be operating under. The reader then uses the selected option to establish an initial value for a control variable that controls the exposure time of the reader. This initial selection has the effect of causing the reader to begin operation with an exposure time value that is closer to its final exposure time value than would otherwise be the case. As a result, there is a substantial reduction in the total number of exposure adjustments that will later have to be made to bring the illumination level of the reader within the window of acceptability that characterizes the actual use thereof.

Another feature that allows the reader to achieve an acceptable illumination level in a short time comprises the use of at least one stored exposure control program which is designed to minimize the number of adjustments necessary for the illumination level to enter the window of acceptability. In a first embodiment the adjusting program is arranged to periodically sample the magnitude of the illumination signal and to increment or decrement the control variable when the illumination signal is found to have fallen outside the window during a scan. The program then waits for the end of the scan and uses the latest control variable value to control the exposure time for the next scan. By waiting for the end of the scan, the circuitry avoids changing the exposure time during the scan and thereby creating a risk that a marginal but still decodable scan result will be made non-decodable.

In a second embodiment, the exposure control program is also arranged to periodically sample the magnitude of the illumination signal, but to change the above-mentioned control variable by multiplying or dividing its latest value by a number such as 2. This embodiment has the advantage that it can change the exposure time of the sensor more quickly than a program which can change its count by addition or subtraction. Other exposure control programs which are specially optimized for particular operating environments may also be used under appropriate conditions.

In spite of its applicability to image sensors having exposure times that are controlled by externally generated start and stop signals, the present invention may also be applied to more sophisticated image sensors which have exposure times that are controlled by externally generated exposure time signals. Such an external signal might, for example, comprise a digital signal which specifies the exposure time of the image sensor in terms of a specified number of milliseconds. This is possible because there is a simple relationship between these two types of exposure control signals which allows them to be used as equivalents of one another, with only minor changes to the associated exposure control programs. Thus, the use of the present invention is not restricted to use with any one particular type of image sensor.

DESCRIPTION OF THE DRAWINGS

Other objects and advantages of the invention will be apparent from the following description and drawings, in which:

FIGS. 4, 4A and 4B together comprise a flow chart of one embodiment of an exposure control program suitable for use with the embodiment of FIG. 1.

DESCRIPTION OF THE PREFERRED EMBODIMENTS

Figure 1:
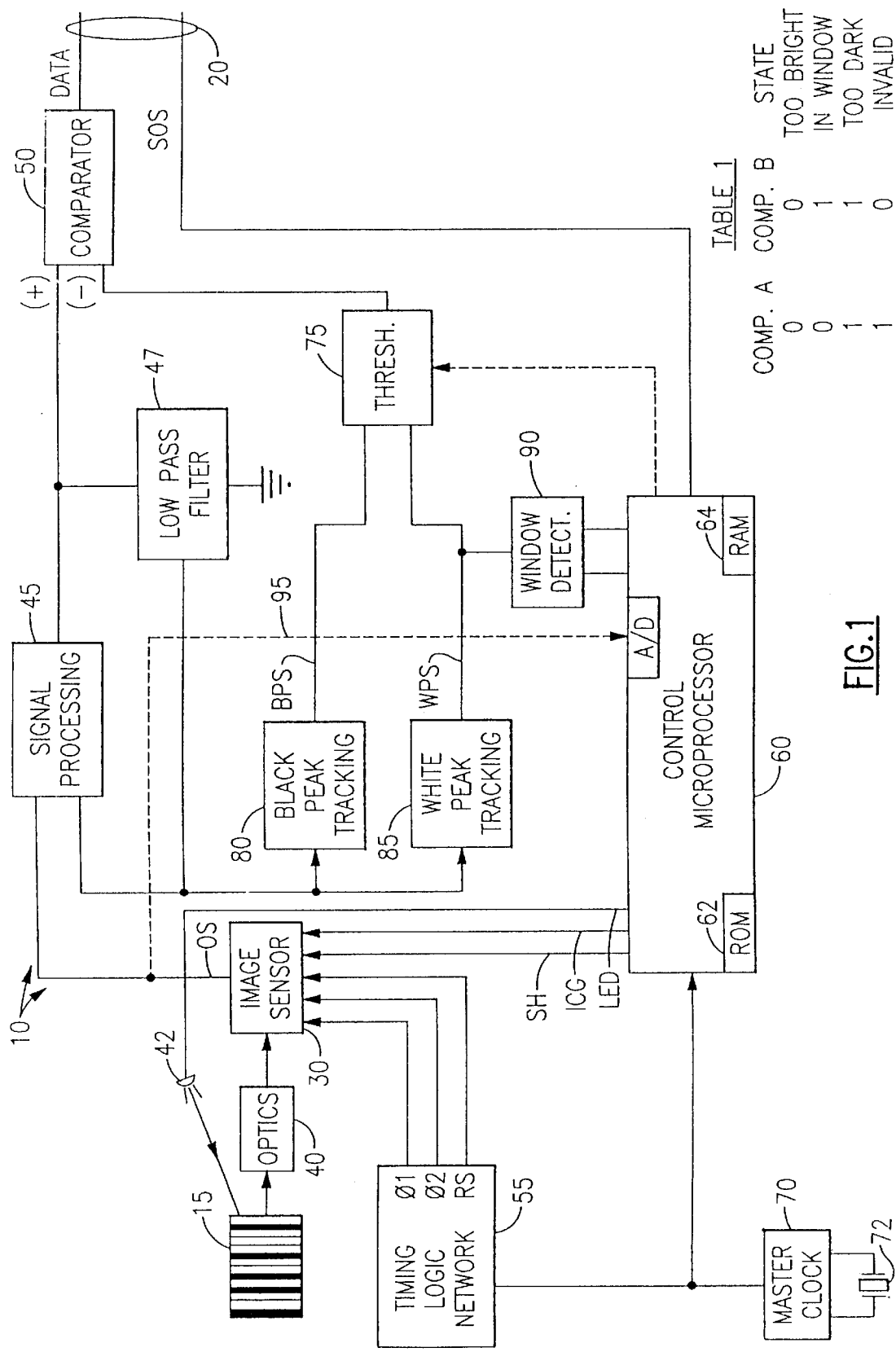
FIG. 1 is an optical-electronic block diagram which shows one embodiment of an imaging or reading engine constructed in accordance with the present invention.

Referring to FIG. 1 there is shown a optical-electronic block diagram of one embodiment of an optical reading apparatus or device 10 that is constructed in accordance with the present invention. Apparatus 10 serves to optically read or scan data encoded in a target indicia 15, here shown as a one dimensional (1D) bar code symbol, and to apply to an output 20 an electrical signal which may be decoded in a known manner by any of a variety of commercially available decoder devices (not shown) to produce a usable representation of the data encoded in indicia 15. Because devices such as that shown in FIG. 1 provide decodable rather than decoded data, they are often referred to as "engines" rather than as "readers", i.e., engines that are equipped with decoders. Since the present invention is equally applicable to engines and to readers, however, this distinction is unimportant for purposes of the present description. As a result, the present description will be understood to apply both to readers and to engines, even when it uses only the more commonly used term "reader".

In the embodiment of FIG. 1, the reader of the invention includes an image sensor 30 of the type having a 1D array of photosensitive picture elements or pixels 32 (best shown in FIG. 3) upon which an image of bar code symbol 15 may be focused by a suitable optical assembly 40. The light forming this image will ordinarily be derived in part from ambient light and in part from a suitable light source 42 that is built into the reader and powered thereby. Image sensor 30 serves to convert this optical image into an electrical output signal OS which is further processed by a signal processing circuit 45 and a comparator 50 to produce a digital output signal labelled DATA for application to a decoder (not shown) via output 20.

The timing and control signals necessary to operate image sensor 30 are supplied thereto, in part, by a timing logic network 55 and, in part, by a programmed control device 60, which preferably comprises a microprocessor, such as a Motorola HC05, having on-chip program and data memories 62 and 64, respectively. The timing of timing logic network 55 and microprocessor 60 are controlled by a master clock 70 having an operating frequency that is, in turn, controlled by a suitable crystal 72. The manner in which image sensor 30 is controlled in accordance with these timing and control signals will be described more fully later in connection with the block diagram of FIG. 3, the timing diagram of FIG. 3A and the flow charts of FIGS. 4A, 4B, 5A and 5B.

To the end that the digital signal at output 20 may more accurately reflect the transitions of the white and black data elements of indicia 15, the reader of FIG. 1 includes a threshold voltage generating circuit 75 for controlling the threshold voltage used by comparator 50. Threshold circuit 75 serves to increase or decrease the latter voltage in accordance with the difference between black and white peak signal voltages BPS and WPS that are derived from image sensor output signal OS by black and white peak tracking circuits 80 and 85, respectively, via signal processing circuit 45 and low pass filter 47. This arrangement allows comparator 50 to reference its detection of data element transitions to a known proportion of the peak-to-peak output voltage of image sensor 30, thereby reducing the effect of instantaneous fluctuations in the ambient light level at indicia 15. Because signal processing, threshold and tracking circuits of this type are known in the art, and are included in readers that are commercially available from Welch Allyn, Inc. under the product designation ST-3400, they will not be further described herein.

Figure 3:
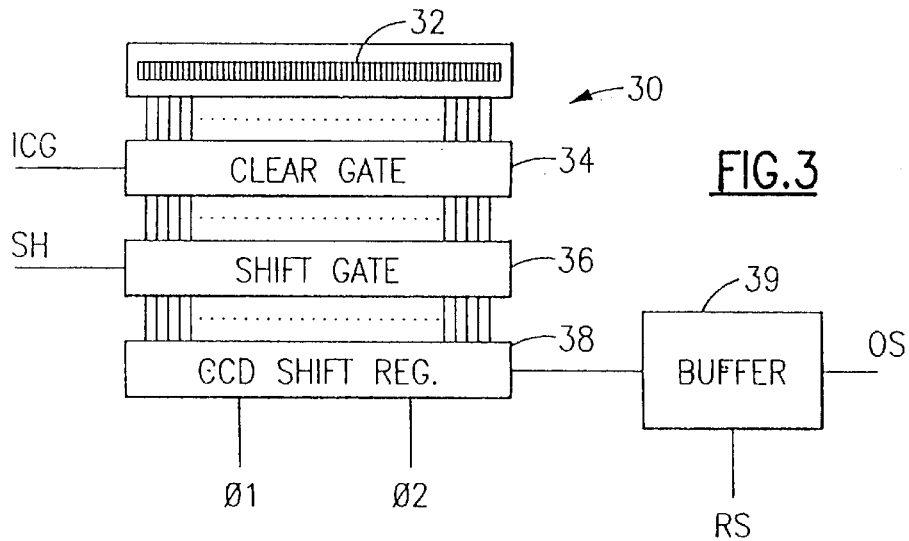
FIG. 3 is a block diagram of one image sensor of a type suitable for use in the embodiment of FIG. 1.
Figure 3A:
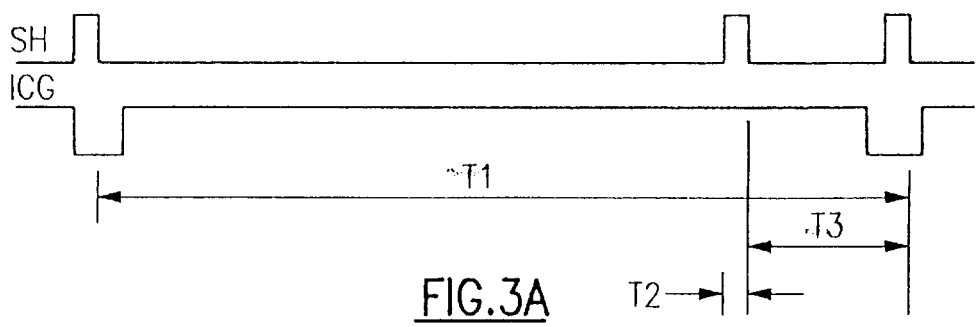
FIG. 3A is a timing diagram that illustrates the operation of the image sensor of FIG. 3.

Referring to FIG. 3, there is shown a simplified block diagram of one image sensor of a type that may be used in practicing the present invention, namely: a model TCD 1205D image sensor manufactured by Toshiba Corp. This image sensor includes a 1D photosensitive array 32 that includes 2048 pixels, a clear gate 34 which is controlled by an integration clear signal ICG, a shift gate 36 which is controlled by a shift signal SH, a CCD analog shift register 38 out of which data may be serially shifted by clock signals 01 and 02, and signal output buffer 39 which is controlled by a reset signal RS. Not shown, for the sake of clarity, is the internally bifurcated structure of gates 34 and 36 and register 38.

The operation of the image sensor of FIG. 3 may be summarized as follows. The scan period of sensor 30 is the time between those successive high to low transitions of shift signal SH which coincide with the low state of normally high signal ICG, as shown by time T1 in FIG. 3A. High to low transitions of shift signal SH which occur during the high state of signal ICG causes the pixels of array 32 to be cleared or "dumped", as shown during time period T2 of FIG. 3A. Together, these operations cause the image sensor to have an exposure which occupies the terminal portion of the scan period, and which is started and stopped by signals SH and ICG. Pixel data produced during the exposure time is parallel shifted from array 32 to shift register 38 when signal SH is high while signal ICG is low and signal 1 goes high. The shifted data for each scan is then serially clocked out, via buffer 39, while the pixels of array 32 are being exposed to gather data for the next scan.

In view of the foregoing it will be seen that control signals SH and ICG together control both the exposure time and the scan period of image sensor 30. It will also be seen that, because the time necessary to shift out serial data, i.e., the data read out time, is fixed by the number of pixels and the clock frequency, there is no direct relationship between the data read out time and the scan period of sensor 30. In accordance with one feature of the present invention, these properties make it possible to vary the exposure time and scan period of the reader of the invention over a surprisingly broad range, thereby enabling the reader to read indicia over a wide range of distances, i.e., with a large depth of field.

In the preferred embodiment, exposure control signals SH and ICG are generated by microprocessor 60, in accordance with a stored program that is designed to cause the output signal of image sensor 30 to assume, within the shortest possible time, a value that is within a window bounded by predetermined maximum and minimum values. Exposure control signals SH and ICG can be used in this way because both the intensity of the light incident on sensor 30 and the exposure time thereof affect the magnitude of sensor output OS. As a result, increases in exposure time can compensate for decreases in light intensity and vice-versa.

The illumination information necessary to maintain sensor output signal OS within the desired range of values may be derived therefrom either directly or indirectly. In most cases, it is preferable to derive this information indirectly. This is because indirect derivation allows the sensor output signal to be scaled, low pass filtered or otherwise processed in a way that allows the desired illumination information to be more conveniently handled. In order to reflect the variety of forms which the desired illumination information may take, the present description will use the term "illumination signal" to refer generically to any signal that varies in accordance with sensor output signal OS, without regard to whether the signal is analog or digital or whether the signal is derived from signal OS directly or indirectly.

In the embodiment of FIG. 1 the illumination signal comprises the output signal WPS produced by white peak tracking circuit 85. As previously explained, the latter signal has a value which varies in accordance with sensor output signal OS, but which has been processed and low pass filtered so that it reflects the time averaged maximum illumination level at sensor 30, rather than mere transient light intensity fluctuations at indicia 15. In the circuit of FIG. 1 the determination as to whether the illumination signal falls within the desired illumination window is performed by a hard-wired analog window detector circuit 90, which may comprise the comparator circuitry shown in FIG. 2. The window detecting function may also, however, be performed by an equivalent digital window detecting subroutine executed by microprocessor 60, provided that signal WPS is first converted to digital form and provided that microprocessor 60 has sufficient program memory and the time necessary to repeatedly execute such a subroutine. This digital form should be processed to extract the appropriate information for finding the time averaged value of the maximum illumination level.

Figure 2:
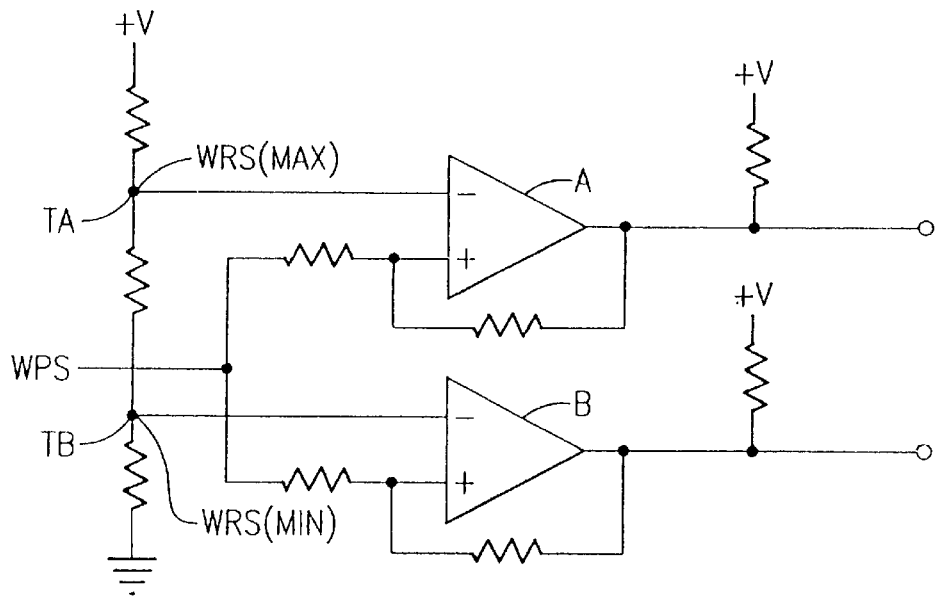
FIG. 2 is a schematic diagram of one part of the embodiment of FIG. 1.

Referring to FIG. 2, window detector circuit 90 includes a first comparator A for determining whether white peak signal WPS has a value greater than a first DC window reference signal WRS (MAX) which is derived from a suitable voltage divider tap TA and which sets the value of the maximum acceptable value of the illumination signal. Similarly, window detector circuit 90 includes a comparator B for determining whether white peak signal WPS is less than a second DC reference window signal WRS (MIN) which is derived from a suitable voltage divider tap TB and which sets the value of the minimum acceptable value of the illumination signal. Given the connections shown in FIG. 2, the outputs of comparators A and B will produce the combinations of output states shown in Table 1. More particularly, comparators A and B will produce the combination of output states O and I, respectively, only when illumination signal WPS is within the window of acceptability bounded by signals WRS (MAX) and WRS (MIN). Other combinations such as 00 and 11 indicate that the illumination signal is not within this window, i.e., is too high or too low, respectively (or cannot occur). Because circuits of the type shown in FIG. 2 operate in a manner well-known to those skilled in the art, that circuit will not be described in detail herein.

The manner in which the output signals of window detector circuit 90 are used in accordance with the invention will be described presently conjunction with the flow charts of FIGS. 4A, 4B, 5A and 5B.

As explained earlier, the magnitude of the illumination signal of the present invention may also be derived directly from output signal OS of image sensor 30. In FIG. 1, determining the magnitude of the illumination signal may be accomplished by connecting the output of sensor 30 directly to an I/O port of microprocessor 60, or to an A/D converter which is connected to such a port as, for example, by a conductor 95 shown in dotted lines in FIG. 1. With this embodiment, the analog output signal of sensor 30 is converted to digital form by the external A/D converter or by an A/D converter that is built into processor 60. Once converted to digital form, the illumination signal may be processed by means of a digital window detecting subroutine to produce window state signals, such as those shown in Table 1, in a manner that will be apparent to those skilled in the art. Depending upon the application, and the speed and power microprocessor 60, this A/D conversion may be performed on each pixel of the image sensor output, each Nth pixel of the image sensor output, or selected centrally located representative pixels thereof. It will be understood that all such sampling methods are within the contemplation of the present invention.

The operation of the exposure control circuitry of the invention will now be described with reference to the flow charts of FIGS. 4A, 4B, 5A and 5B.

Advantageously, the exposure control function of the present invention begins with blocks 100 and 105 which represent one of the known set-up procedures that are used to program a reader each time that it is first turned on after having been unused for a substantial time, such as overnight. In accordance with the invention, this procedure is modified to include steps that result in the generation of a signal that provides a general indication of the overall ambient light condition under which the reader will be used. This may, for example, be done by presenting to the user a menu that includes a short list of selectable options such as: a) outdoors, b) indoors with bright lighting conditions, or c) indoors with dim lighting, etc. and by using the selected option to fix the initial value of a control variable that determines the initial exposure time for sensor 30. This may also be done, without the active participation of the user, by performing a series of exploratory scans (with light source 42 off) with exposure times that correspond to the user selectable options and selecting the option that most nearly corresponds to the result of the scan.

Once the ambient light condition has been coarsely determined, and the set-up procedure has been completed, the processor continues to blocks 110 and 115. These blocks cause the reader to use the selected ambient light condition to determine the initial value of the control variable and to set the reader to begin operation with that value.

In readers that include image sensors, such as the Toshiba 1205D, that are controlled by externally generated start-stop signals such as SH and ICG, the control variable may comprise the count, herein referred to as the "shutter count", which is set into a working counter at the start of the scan period of the sensor. This count is then decremented by a suitable shutter clock signal until, upon reaching zero, a signal is applied to the sensor to start the exposure interval. The exposure interval then continues until the end of the scan period. Accordingly, in such readers, the exposure time of the sensor will be dependent upon the duration of the scan period and the magnitude of the shutter count. Thus, the relationship between the exposure time and the control variable will be an indirect or inverse one.

The present invention may also, however, be practiced using image sensors which generate their own exposure start and stop signals based on exposure time values that are generated by circuitry external to the sensor. In readers of this type the number, count, etc. which defines or specifies the desired exposure time value comprises the control variable and may be used merely be loading it into a suitable hardware or software exposure timer. The sensor then exposes the pixel array during the period between the starting and stopping of the timer. In such readers, the relationship between the exposure time of the sensor and the control variable is a direct one.

In spite of their apparent differences, the two above-described control variable relationships are equivalent for purposes of the present invention. This is because the present invention is not dependent upon whether the control variable controls the exposure time of the sensor directly or indirectly, or upon whether the exposure interval is started and stopped by circuitry that is internal to or external to the image sensor. Accordingly, while the remainder of the flow charts of FIGS. 4A, 4B, 5A and 5B, will be discussed in terms of a control variable (shutter count) that is indirectly related to exposure time, it will be understood that, with only minor modifications of a type that will be apparent to those skilled in the art, they can be used with a reader that uses a control variable that is directly related to exposure time.

Returning to FIG. 4A, once the reader has been set to use the initial control variable value determined from blocks 100–110, the processor continues to block 120. This block causes the processor to wait for the user to request a scan by pulling the readers' trigger or, if the reader is not of the trigger actuated type, moving a target indicia into the readers' field of view. When this occurs, the processor proceeds to block 125 which causes it to wait for the actual start of a scan. This will ordinarily be preceded by the illumination of light source 42.

Figure 4B:
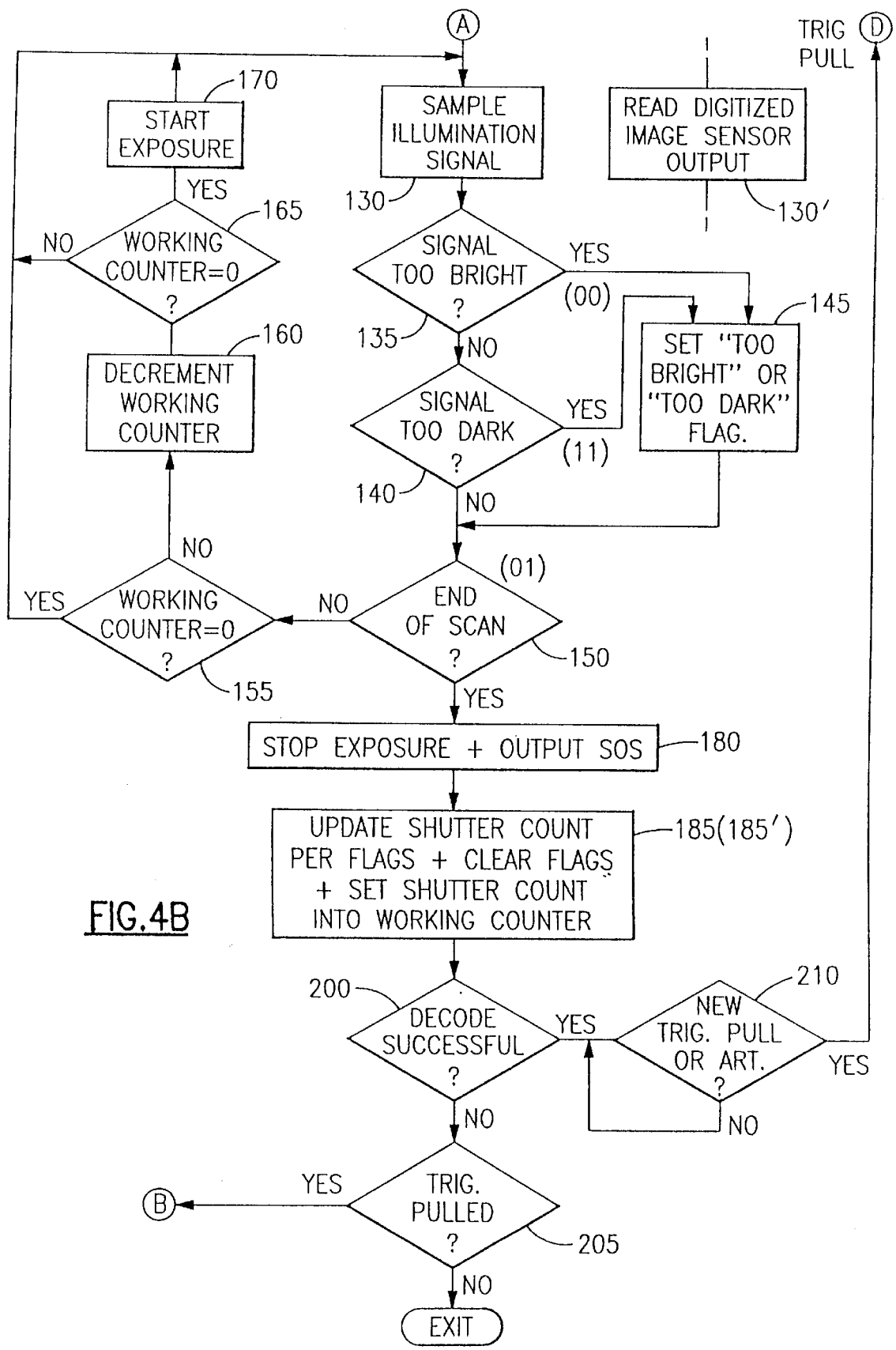

Referring to FIG. 4B, the start of a scan directs the processor to a set of blocks 130, 135, 140, 145 and 150, which together sample the illumination signal, and determine if it has a magnitude that is within a predetermined window of acceptable illumination values. These steps are accomplished by examining the outputs of window detector 90 to determine which of the states shown in Table 1 applies. If this examination indicates that the illumination signal is too bright (block 135), i.e., state 00 of Table 1 is detected, the reader will store that fact, as called for by block 145 as, for example, by setting a suitable "too bright" flag. Whether or not the illumination signal is too bright, the processor proceeds to block 140, which determines whether the illumination signal is too dark, i.e., whether state 11 of Table 1 is detected. If the latter state is detected, the processor will store that fact as called for by block 145 as, for example, by setting a "too dark" flag. Naturally, if the illumination signal is within the window of acceptability neither of these flags will be set. The processor then proceeds to block 150, which causes it to determine whether the scan period is over before looping back for another sample, as will be discussed more fully later.

In the event that the illumination signal is a digital signal derived directly from image sensor output signal OS, e.g., via conductor 95, block 130 may be replaced by a read block 130', and blocks 135 and 140 may be replaced by blocks (not shown) which call for digital comparisons similar to the analog comparisons performed by comparators A and B. Together, these blocks perform a window detecting function which is equivalent to that of blocks 130–145 and window detector 90. Because this alternative type of window determination is of a type well-known to those skilled in the art, it will not be described in detail herein.

In the preferred embodiment of FIG. 4B, the exposure control program is arranged so that the detection of even a single "too bright" condition during a scan will cause the control variable to be changed in a direction which decreases the exposure time used for the next scan. It is also arranged, however, so that a "too dark" condition is detected only if the illumination signal remains outside the window of acceptability during substantially an entire scan. This difference in treatment is desirable to assure that the exposure time of the reader is not flagged for an increase in exposure time merely because black data elements of the indicia causes the illumination signal to have a series of low values. It also assures that the window detection process does not result in indications that the illumination signal is both too bright and too dark. In any case, the outcome of a scan will be either the setting of a "too bright" flag or the setting of a "too dark" flag, but not both. As will be explained more fully presently, the control variable is updated, if at all, once at the end of each scan and is unchanged thereafter until the end of the next scan.

After a sample illumination signal value has been evaluated in the above-described manner, the processor loops back through blocks 155 through 170 to take additional samples, unless the scan has ended per block 150. Each time it does so, it decrements the shutter count in the working counter by 1, per block 160, unless the counter has already counted down to 0, per block 155. The 0 condition of the working counter is important since it marks the start of the exposure time of sensor 30 in accordance with blocks 165 and 170. Once the 0 condition of the counter is reached, blocks 160–170 are bypassed until the next scan. The sampling process continues, however, until the processor determines per block 150 that the scan has ended. The net result of this processing is that the processor will exit block 150, at the end of a scan, with one of the out-of-window flags set, indicating that the control variable needs to be updated, adjusted, or with neither out-of-window flag set, indicating that the control variable does not need to be adjusted.

Upon exiting the above-described sampling loop at the end of a scan, the processor is directed to block 180. As this occurs, the exposure interval of the sensor is ended and signal SOS is outputted. As explained earlier, the latter signal, together with signal DATA, comprise the output of the reader at output 20.

Figure 5A:
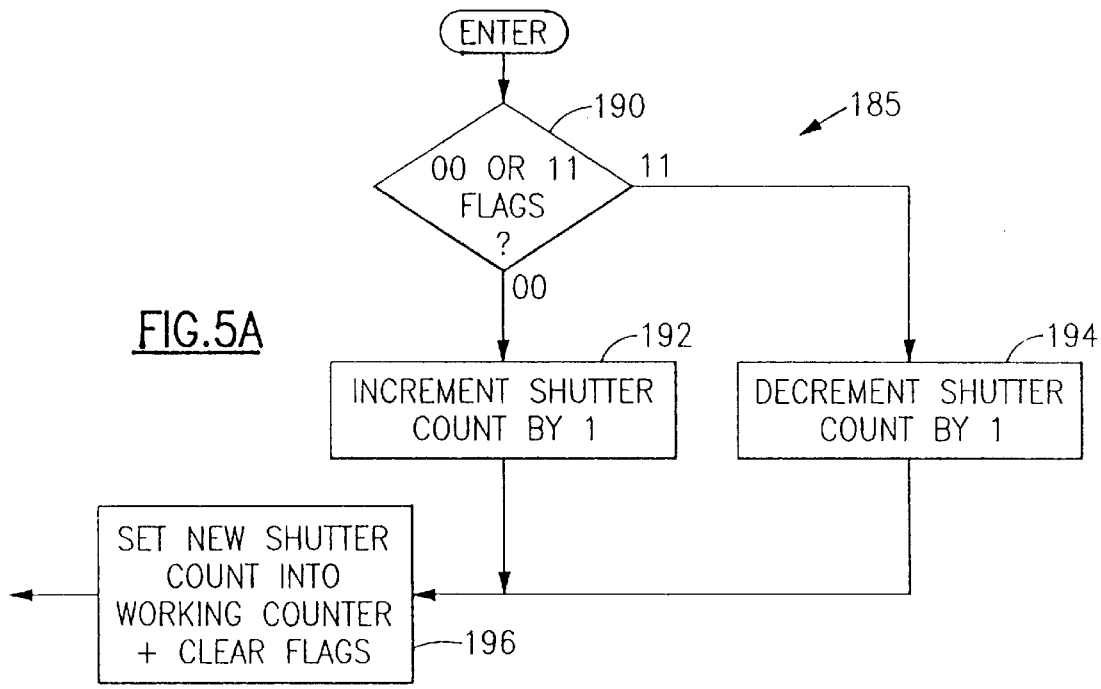
FIG. 5A and 5B comprise alternative embodiments of exposure adjusting subroutines which may be used with the flow chart of FIGS. 4A and 4B.
Figure 5B:
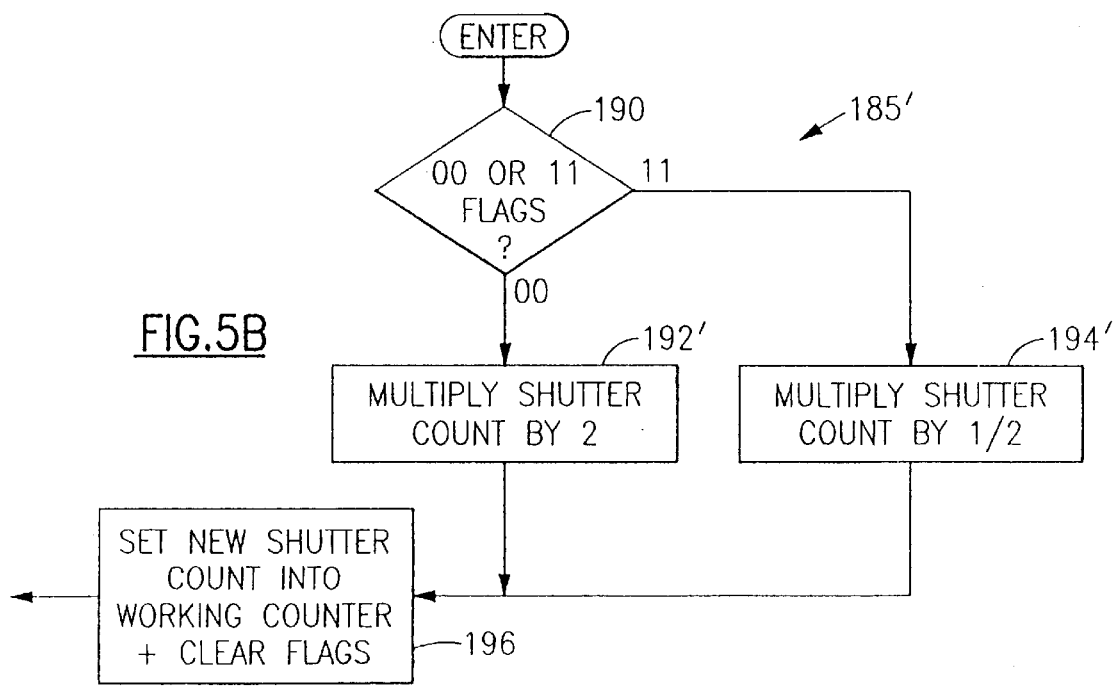

On exiting block 180, the processor enters a control variable adjusting block 185, two alternative representations of which are shown in greater detail in FIGS. 5A and 5B. Turning first to the embodiment of FIG. 5A, the processor first encounters a block 190 which directs it either to block 192 or 194, depending on whether the "too bright" or the "too dark" flag has been set. If it is the former, the stored shutter count value is incremented by 1 to reduce the exposure time by one unit; if it is the latter, the shutter count is decremented by one to increase the exposure time by one unit. In either case, the processor is directed to block 196, which causes it to set the updated shutter count into the working counter and clear the flags in preparation for the next scan.

Once the processor has exited adjusting block 185, it is in condition to begin the next scan with its new control variable value (if any) in place. Whether or not it immediately begins a new scan depends on whether the last scan produced a decodable result and, if it did, whether or not another read operation is being called for by the user. These various alternatives are processed in accordance with blocks 200–210, which direct the processor back to different points in the flow chart of FIG. 4A depending on the outcome of the scan and the intentions of the user. Because these blocks are self-explanatory, their operation will not be described in detail herein.

In view of the foregoing, it will be seen that the exposure control process illustrated in FIGS. 4A, 4B and 5A includes a window detecting step comprising a determination of whether the illumination signal is or is not within a window of acceptability and an adjusting step comprising a changing of the control variable in accordance with a stored adjustment strategy designed to minimize the number of adjustments. Because the in-window/out-of-window determination is performed largely by hardware, and because the adjustment of the control variable requires only a few rapidly executable instructions, the entire exposure control process may be executed in a relatively short time, particularly when used in conjunction with the initial control variable selection or determination that is made during the initial programming of the reader. In addition, because control variable adjustments are made only once, at the end of a scan, the exposure determination process is able to avoid the adverse effects of conditions, such as hunting, that can occur if the control variable is changed too frequently. As a result, the exposure control process of the invention will be seen to converge rapidly and monotonically on a range of acceptable values, and to do so without requiring large amounts of program memory space or execution time.

In some applications, particularly those in which the window of acceptability is relatively narrow, or in which the control variable has a relatively high resolution (e.g., a large number of bits), even the above-described exposure control process can require that numerous scans be made before the illumination signal enters the desired window. In such applications, the time necessary for the illumination signal to enter its window of acceptability may be substantially reduced by substituting the updating routine shown in FIG. 5B for that shown in FIG. 5A. This is because the updating routine 185' shown in FIG. 5B is arranged to update the control variable by the process of multiplication and division, rather than by the process of addition and subtraction, thereby greatly reducing the time necessary to make large adjustments.

More particularly, referring to FIG. 5B, the detection of a "too bright" (00) condition results in the value of the stored shutter count being multiplied by 2, as shown by block 192'. Conversely, the detection of a too dark (11) condition results in the value of the stored shutter count being multiplied by ½ (or, equivalently, divided by 2), as shown by block 194'. These multiplications are accomplished easily and quickly by shifting the contents of the stored shutter count 1 place to the left or one place to the right, respectively. Significantly, this does not result in overadjustment or underadjustment. This is because the exposure interval is initiated when the working shutter count reaches 0 (blocks 165 and 170), and because the shifting right or shifting left of the stored shutter count (blocks 192' and 194') causes the latter to change in increments that correspond to the least significant bits thereof.

In its broadest aspect, the present invention is not limited to the exemplary high speed updating routines shown in FIGS. 5A and 5B. The latter routines could, for example, be replaced by routines in which the control variable is updated on the basis of flag data or flag patterns that are stored and accumulated over a plurality of successive scans, or that vary according to any predetermined rule that can be stored in the program memory. In addition, the present invention is not limited to embodiments in which adjustments in the control variable are made at or after the end of a scan, or to embodiments in which adjustments in the control variable are made only once during a scan. It will therefore be understood that variants of all of these types are within the contemplation of the present invention.

While the foregoing description makes reference to a number of specific embodiments, it will be understood that the true spirit and scope of the present invention should be determined with reference to the appended claims.

What is claimed is:

1. An apparatus for optically scanning encoded data from an optically readable indicia and converting said data into an electrical signal that may be decoded to recover said data, said apparatus being of the type which continues scanning, without substantial interruption, until directed to discontinue scanning, including, in combination:
    a) an image sensor, having a pixel array that includes a plurality of pixels, for receiving an image of said indicia and for generating an image sensor signal that varies in accordance with the intensity of light incident on said pixel array and the exposure time of said sensor, said image sensor being of the type having a scan period that includes an exposure period which begins with an exposure start signal that clears the pixels of said pixel array and ends at the end of the respective scan period;
    b) illumination signal generating means responsive to said image sensor signal for generating an illumination signal that varies in accordance with a time averaged value of said image sensor signal;
    c) exposure control means for controlling the exposure time of said image sensor, including:
        (i) exposure initializing means for establishing an initial value for a control variable that determines the duration of said exposure period, said control variable comprising a count that determines the occurrence time of said exposure start signal;
        (ii) window detecting means for detecting, a plurality of times during each scan period, whether said illumination signal is inside or outside of an illumination window bounded by predetermined maximum and minimum illumination values; and
        (iii) adjusting means responsive to a stored program for adjusting said count in one direction if said window detecting means indicates that said illumination signal exceeded said maximum illumination value during a scan and for adjusting said count in the opposite direction if said window detecting means indicates that said illumination signal fell below said minimum illumination value during a scan, said adjusting being accomplished by one of incrementing or decrementing said count and multiplying said count by a predetermined number;
    d) whereby said illumination signal progressively takes on a value which is within said illumination window.

2. The apparatus of claim 1 in which said exposure initializing means comprises menuing means, responsive to a stored program, for displaying to a user a plurality of user selectable options each characterizing a different respective initial illumination condition, and for responding to a user selected option by establishing different respective initial values for said count.

3. The apparatus of claim 1 in which said exposure initializing means comprises means, responsive to a stored program, for initiating a plurality of exploratory scans while the apparatus is being prepared for use, and for setting the initial value of said count in accordance with the results of said scans.

4. The apparatus of claim 1 in which the adjusting of said count takes place at the end of each scan during which said illumination signal does not remain within said illumination window.

5. The apparatus of claim 1 in which said exposure control means comprises a programmed microcomputer, and in which said window detecting means and said adjusting means are implemented by means of said stored program.

6. The apparatus of claim 5 in which said illumination signal generating means comprises an analog-to-digital converter connected between said image sensor and said microcomputer.

7. An apparatus for optically scanning encoded data from an optically readable indicia and converting said data into an electrical signal that may be decoded to recover said data, said apparatus being of the type which continues scanning, without substantial interruption, until directed to discontinue scanning, including, in combination:
    a) an image sensor, having a pixel array that includes a plurality of pixels, for receiving an image of said indicia and for generating an image sensor signal that varies in accordance with the intensity of light incident on said pixel array and the exposure time of said sensor, said image sensor being of the type having a scan period that includes an exposure period which begins with an exposure start signal that clears the pixels of said array and ends at the end of the respective scan period;
    b) illumination signal generating means responsive to said image sensor signal for generating an illumination signal having a magnitude that varies in accordance with a time averaged value of said image sensor signal;
    c) exposure control means for generating said exposure start signal, said exposure control means including:
        (i) counting means for storing, for each scan, a count that determines the occurrence time of the exposure start signal for that scan;
        (ii) window detecting means for detecting, a plurality of times during a scan period, whether said illumination signal has a value that is inside or outside of an illumination window bounded by predetermined maximum and minimum illumination values; and
        (iii) exposure time determining means responsive to said widow detecting means for increasing said count if said illumination signal exceeds said maximum illumination value during a scan, and for decreasing said count if said illumination signal falls below said minimum illumination value during a scan, said increasing and decreasing being accomplished by one of adding to or subtracting from said count and multiplying or dividing said count;
    d) whereby said illumination signal is caused to approach and enter said illumination window in a stepwise manner.

8. The apparatus of claim 7 in which said exposure control means includes menuing means for displaying to a user a plurality of user selectable options each associated with a different respective initial illumination condition, and for responding to a user selected option by establishing different respective initial values for said count.

9. The apparatus of claim 7 in which said exposure control means includes means for initiating a plurality of exploratory scans while the apparatus is being prepared for use, and for setting the initial value of said count in accordance with the results of said scans.

10. The apparatus of claim 7 in which said exposure time determining means changes said count at the end of each scan during which said illumination signal does not remain within said window.

11. The apparatus of claim 7 in which said exposure control means comprises a microcomputer, and in which the functions of said counting means, said window detecting means and said exposure time determining means are carried out by said microcomputer.

12. The apparatus of claim 11 in which said illumination signal generating means comprises an analog-to-digital converter connected between said image sensor and said microcomputer.

13. An apparatus for optically scanning encoded data from an optically readable indicia and converting said data into an electrical signal that may be decoded to recover said data, said apparatus being of the type which continues scanning, without substantial interruption, until directed to discontinue scanning, including, in combination:

a) an image sensor, having a pixel array that includes a plurality of pixels, for receiving an image of said indicia and for generating an image sensor signal that varies in accordance with the intensity of light incident on said pixel array and the exposure time of said sensor, said image sensor being of the type having a scan period that includes an exposure period which begins with an exposure start signal that clears the pixels of said pixel array and ends at the end of the respective scan period;

b) illumination signal generating means responsive to said image sensor signal for generating an illumination signal that varies in accordance with said image sensor signal;

c) exposure control means for controlling the exposure time of said image sensor, including:

(i) counting means for storing, for each scan, a count that determines the occurrence time of said exposure start signal;

(ii) window detecting means for detecting, a plurality of times during each scan period, whether said illumination signal is inside or outside of an illumination window bounded by predetermined maximum and minimum illumination values; and (iii) adjusting means for adjusting said count in a first direction if said window detecting means indicates that said illumination signal was less than said minimum illumination value during substantially all of a scan, and for adjusting said count in a second direction if said illumination signal exceeded said maximum illumination value during a scan, the adjusting of said count being accomplished by one of incrementing or decrementing said count and multiplying or dividing said count by a predetermined number;

d) whereby said illumination signal progressively takes on a value which is within said illumination window.

14. The apparatus of claim 13 in which said exposure control means includes menuing means, responsive to a stored program, for displaying to a user a plurality of user selectable options each characterizing a different respective initial illumination condition, and for responding to a user selected option by establishing different respective initial values for said count.

15. The apparatus of claim 13 in which said exposure control means includes means, responsive to a stored program, for initiating a plurality of exploratory scans while the apparatus is being prepared for use, and for setting the initial value of said count in accordance with the results of said scans.

16. The apparatus of claim 13 in which the adjusting of said count takes place at the end of each scan during which an adjusting of said count is necessary.

17. The apparatus of claim 13 in which said exposure control means comprises a programmed microcomputer, and in which said window detecting means and said adjusting means are implemented by means of a stored program.

18. The apparatus of claim 17 in which said illumination signal generating means comprises an analog-to-digital converter connected between said image sensor and said microcomputer.

* * * * *